United States Patent
Lee et al.

(10) Patent No.: US 10,608,702 B2
(45) Date of Patent: Mar. 31, 2020

(54) NEAR FIELD COMMUNICATION DEVICE

(71) Applicant: SAMSUNG ELECTRONICS CO., LTD., Suwon-si, Gyeonggi-do (KR)

(72) Inventors: Young Joo Lee, Yongin-si (KR); Jong Pil Cho, Hwaseong-si (KR); June Soo Kim, Daegu (KR); Il Jong Song, Suwon-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 2 days.

(21) Appl. No.: 16/000,007

(22) Filed: Jun. 5, 2018

(65) Prior Publication Data

US 2019/0132027 A1  May 2, 2019

(30) Foreign Application Priority Data

Nov. 2, 2017  (KR) .................. 10-2017-0145466

(51) Int. Cl.
| | |
|---|---|
| *H04B 5/00* | (2006.01) |
| *H04W 4/80* | (2018.01) |
| *H04W 76/28* | (2018.01) |
| *G06F 1/3287* | (2019.01) |
| *H04B 5/02* | (2006.01) |

(52) U.S. Cl.
CPC ......... *H04B 5/0031* (2013.01); *G06F 1/3287* (2013.01); *H04B 5/0056* (2013.01); *H04W 4/80* (2018.02); *H04W 76/28* (2018.02); *H04B 5/02* (2013.01)

(58) Field of Classification Search
CPC ...... H04B 5/0031; H04B 5/02; H04B 5/0062; H04B 5/0081; H04B 5/0056; H04W 88/06; H04W 92/08; H04W 56/001; H04W 56/0035; H04W 4/44; H04W 4/80; H04W 76/28
USPC ....................................... 455/41.1
See application file for complete search history.

(56) References Cited

U.S. PATENT DOCUMENTS

| | | | |
|---|---|---|---|
| 5,321,851 A | 6/1994 | Sugayama et al. | |
| 8,207,831 B2 | 6/2012 | Ganz | |
| 2006/0087428 A1* | 4/2006 | Wolfe | G08B 25/085 340/539.22 |

(Continued)

FOREIGN PATENT DOCUMENTS

| | | |
|---|---|---|
| EP | 3 156 935 A1 | 4/2017 |
| JP | 2006-031473 A | 2/2006 |

(Continued)

*Primary Examiner* — Ajibola A Akinyemi
(74) *Attorney, Agent, or Firm* — Lee IP Law, P.C.

(57) ABSTRACT

A near field communication (NFC) device includes a communications module and a controller. The communications module includes a receiver to receive a wireless signal, a transmitter to transmit data by superimposing the data on the wireless signal, and a signal detector to compare the wireless signal with a predetermined reference signal. The communications module operates in at least one of a wakeup mode and a sleep mode, the receiver and transmitter are activated to operate in wakeup mode, and the receiver and transmitter are deactivated in sleep mode. The controller adjusts the sensitivity of the signal detector based on a magnitude of the wireless signal and an operating condition of the communications module when the communications module enters the wakeup mode from the sleep mode.

19 Claims, 13 Drawing Sheets

(56) References Cited

U.S. PATENT DOCUMENTS

| | | | |
|---|---|---|---|
| 2012/0044053 A1 | 2/2012 | Jung et al. | |
| 2014/0378052 A1* | 12/2014 | Hamada | G06F 1/3225 |
| | | | 455/41.1 |
| 2016/0181695 A1* | 6/2016 | Mukherjee | H01Q 1/2216 |
| | | | 343/866 |

FOREIGN PATENT DOCUMENTS

| | | |
|---|---|---|
| JP | 2010-187105 A | 8/2010 |
| KR | 10-0184488 B1 | 12/1998 |
| KR | 10-1382779 B1 | 4/2014 |

* cited by examiner

NEAR FIELD COMMUNICATION DEVICE

CROSS-REFERENCE TO RELATED APPLICATION

Korean Patent Application No. 10-2017-0145466, filed on Nov. 2, 2017, and entitled, "Near Field Communication Device," is incorporated by reference herein in its entirety.

BACKGROUND

1. Field

One or more embodiments herein relate to a near field communication device.

2. Description of the Related Art

Near field communication (NFC) technology refers to the exchange of data within a short distance using a specific frequency band. NFC technology has been used in various fields and has certain advantages such as high security. This makes them suitable for use mobile and other devices to, for example, facilitate data exchange functions and electronic payment functions of transportation cards, credit cards, coupons to users using NFC functions.

SUMMARY

In accordance with one or more embodiments, a near field communication (NFC) device includes a communications module including a receiver to receive a wireless signal, a transmitter to transmit data by superimposing the data on the wireless signal, and a signal detector to compare the wireless signal with a predetermined reference signal, the communications module to operate in at least one of a wakeup mode and a sleep mode, the receiver and the transmitter to be activated to operate in wakeup mode, and the receiver and the transmitter to be deactivated in sleep mode; and a controller to adjust a sensitivity of the signal detector based on a magnitude of the wireless signal and an operating condition of the communications module when the communications module enters the wakeup mode from the sleep mode.

In accordance with one or more other embodiments, an NFC device includes a matching network to receive a wireless signal transmitted by an external reader; a comparator to compare a magnitude of the wireless signal with a magnitude of a reference signal; a first magnitude detector connected between the matching network and the comparator, the first magnitude detector to input the wireless signal received by the matching network to the comparator as is; a second magnitude detector connected to the first magnitude detector in parallel between the matching network and the comparator, the second magnitude detector to adjust the magnitude of the wireless signal to be input to the comparator; and a controller to activate at least one of the first magnitude detector and the second magnitude detector based on an operating condition of a communications module communicating with the external reader via the wireless signal and the magnitude of the wireless signal.

In accordance with one or more other embodiments, an NFC device includes a first receiver to operate in a card emulation mode of the NFC device; a second receiver to operate in a reader mode of the NFC device; a transmitter to operate in the card emulation mode and the reader mode; a signal detector to control power supplied to the first receiver and the transmitter based on detection of a wireless signal transmitted by an external reader in the card emulation mode; and a controller to control power supplied to the first receiver and the transmitter based on an output from the signal detector in the card emulation mode. The controller is to lower a sensitivity of the signal detector in a test condition to determine whether the first receiver and the transmitter satisfy a condition for an authentication system for financial transactions, and increase the sensitivity of the signal detector in a normal condition in which the first receiver and the transmitter communicate with the external reader.

In accordance with one or more other embodiments, a non-transitory computer-readable medium comprises code, which, when executed by a processor, causes the processor to control a near field communication (NFC) device, the processor to compare a wireless signal received by a receiver with a predetermined reference signal; and adjust a sensitivity of a signal detector of a communications module based on a magnitude of the wireless signal and an operating condition of the communications module when the communications module enters a wakeup mode from a sleep mode.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
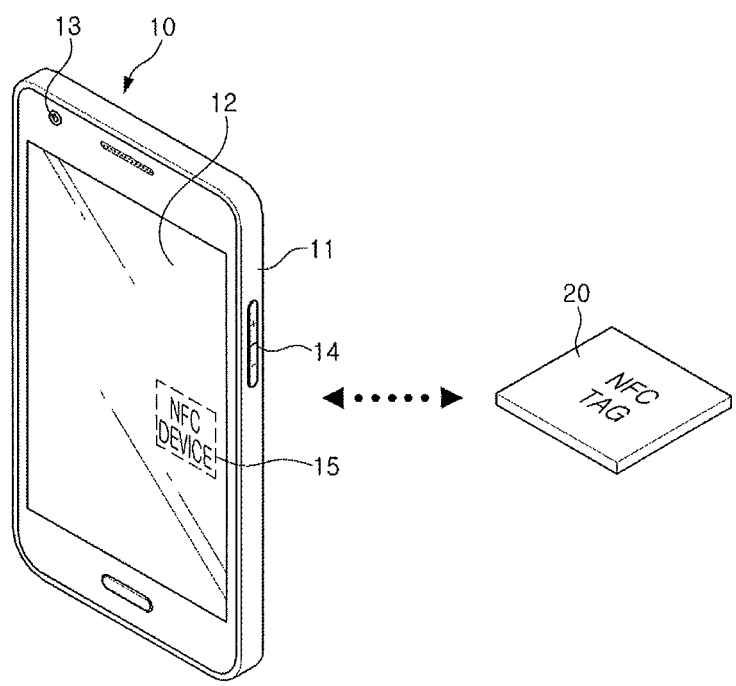
FIG. 1 illustrates an embodiment of a device including an NFC device.
Figure 2:
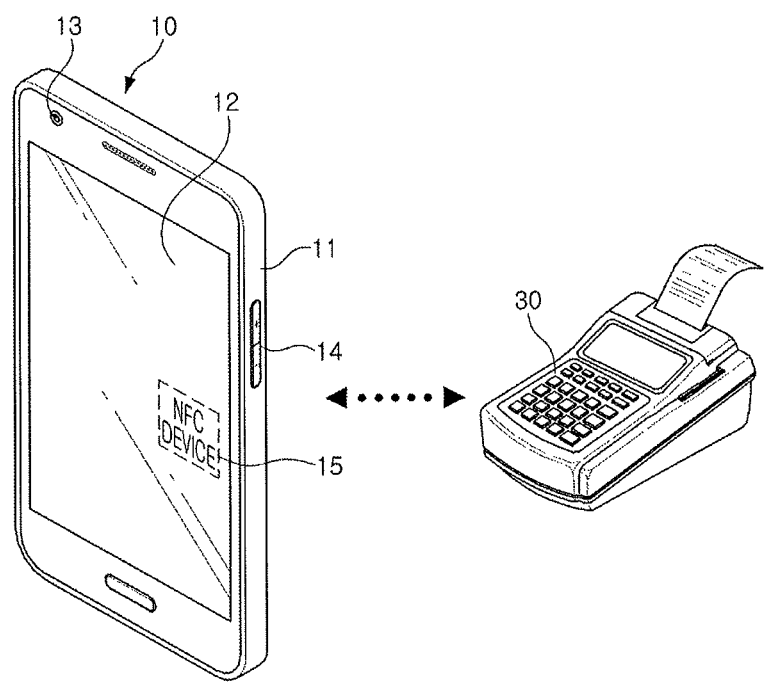
FIG. 2 illustrates an example application of the electronic device of FIG. 1.

FIGS. 1 and 2 illustrate embodiments of an electronic device including a near field communication (NFC) device. Referring to FIG. 1, an electronic device 10 may include a housing 11, a display 12, a camera unit 13, an input unit 14, and an NFC device 15. The electronic device 10 is a mobile device such as a smartphone, a tablet PC, a laptop computer, or another mobile device. The electronic device 10 may be a different type of device in another embodiment. The NFC device 15 may be used in various kinds of devices such as a desktop computer, a home TV set, a set-top box, a refrigerator, a washing machine, a dryer, an air conditioner, or another device.

The NFC device 15 in the electronic device 10 may communicate with an NFC tag 20 using a wireless signal within a specific frequency band. A wireless signal transmitted to the NFC tag 20 by the NFC device 15 may be a signal not containing data. The NFC tag 20 may generate power to operation using the wireless signal received from the NFC device 15.

The NFC tag 20 may transmit the wireless signal, including predetermined data, to the NFC device 15 by including the predetermined data in the wireless signal. For example, the NFC device 15 may exchange data with the NFC tag 20, while exchanging the wireless signal therewith. In an example embodiment, an example of a frequency of the wireless signal used for communications between the NFC device 15 and the NFC tag 20 is 13.56 MHz. The frequency may be different in another embodiment. In the example embodiment of FIG. 1, the NFC device 15 may operate in a reader mode (RW mode) and the NFC tag 20 may operate in a card emulation (CE) mode.

Referring to FIG. 2, the NFC device 15 in the electronic device 10 may communicate with an external reader 30 using a wireless signal within a specific frequency band. In an example embodiment, the external reader 30 may transmit the wireless signal. The NFC device 15 may superimpose data on the wireless signal transmitted by the external reader 30 and may retransmit the signal superimposed with the data to the external reader 30. In the example embodiment of FIG. 2, the NFC device 15 in the electronic device 10 may operate in a card emulation mode.

For example, when the NFC device 15 operates in the card emulation mode, the NFC device 15 may select to operate in a sleep mode or a wakeup mode (depending on the presence or absence of the wireless signal and the magnitude of the wireless signal transmitted by the external reader 30) to reduce power consumption. In an example embodiment, when the distance between the external reader 30 and the NFC device 15 is relatively large (e.g., exceeds a predetermined value) such that the magnitude of the wireless signal is recognized to be low (e.g., below a predetermined value) or is not recognized, the NFC device 15 may enter the sleep mode. When the distance between the external reader 30 and the NFC device 15 is shortened (e.g., to within a prescribed range) or a wireless signal having a magnitude of a predetermined reference value or more is sensed, the NFC device 15 may switch from the sleep mode to the wakeup mode (or another mode) to, for example, exchange data or other information with the external reader 30.

The NFC device 15 may include a signal detection circuit (or detector) to determine switching between the sleep mode and the wakeup mode. The signal detection circuit may sense a wireless signal while the NFC device 15 enters the sleep mode and may compare the magnitude of the wireless signal with a magnitude of a predetermined reference signal, to thereby determine whether the NFC device 15 is to be switched to the wakeup mode. The wireless signal may be generated, for example, by a coil in the NFC device 15, by an RF field output by the external reader 30, or by another circuit or method.

In an example embodiment, when the NFC device 15 switches from the sleep mode to the wakeup mode, the signal detection circuit may determine whether the NFC device 15 may continue to operate in the wakeup mode, based on operations of the NFC device 15 and the presence or absence of the wireless signal and the magnitude of the wireless signal. In an example embodiment, the sensitivity of the signal detection circuit may be changed depending on operations of the NFC device 15. Thus, the magnitude of the wireless signal for switching of the NFC device 15 to the wakeup mode may be changed.

For example, when the NFC device 15 operates in a general operating condition (e.g., a normal condition), the sensitivity of the signal detection circuit may be increased. Thus, the signal detection circuit may also react to a wireless signal having a relatively low magnitude (e.g., lower than a predetermined level) to switch the NFC device 15 to the wakeup mode, and the distance of communication of the NFC device 15 may be increased.

When the NFC device 15 is in a predetermined test condition, the sensitivity of the signal detection circuit may be reduced. For example, in Europay, Mastercard, Visa (EMV) standards, the NFC device 15 may have to satisfy a field off test. In an example embodiment, the field off test may include operations for forcibly reducing the magnitude of an RF field output by the external reader 30 for a predetermined period of time, and then sensing a reduction in the magnitude of the RF field with the NFC device 15, and checking whether the NFC device 15 is switched to the sleep mode. Thus, when the sensitivity of the signal detection circuit is relatively high (e.g., above a predetermined level), the signal detection circuit may not pass the field off test. In this case, compatibility between the external reader 30 and the NFC device 15, authorized based on the EMV standard, may not be guaranteed. As a result, a user of the electronic device 10 in which the NFC device 15 is installed may be inconvenienced.

In an example embodiment, the occurrence of such a compatibility problem (where compatibility between the external reader 30 and the NFC device 15 may not be guaranteed) may be prevented by forcibly lowering the sensitivity of the signal detection circuit in test conditions to receive authentication, based on an EMV or another standard. As an example, when the field off test corresponding to the EMV standard is performed, the NFC device may enter a sleep mode (based on a reduction in magnitude of a wireless signal transmitted by the external reader 30) as the sensitivity of the signal detection circuit is reduced. Thus, deterioration in performance of the NFC device 15 may be reduced or prevented by increasing the sensitivity of the signal detection circuit in a normal condition, while satisfying the test condition.

Figure 3:
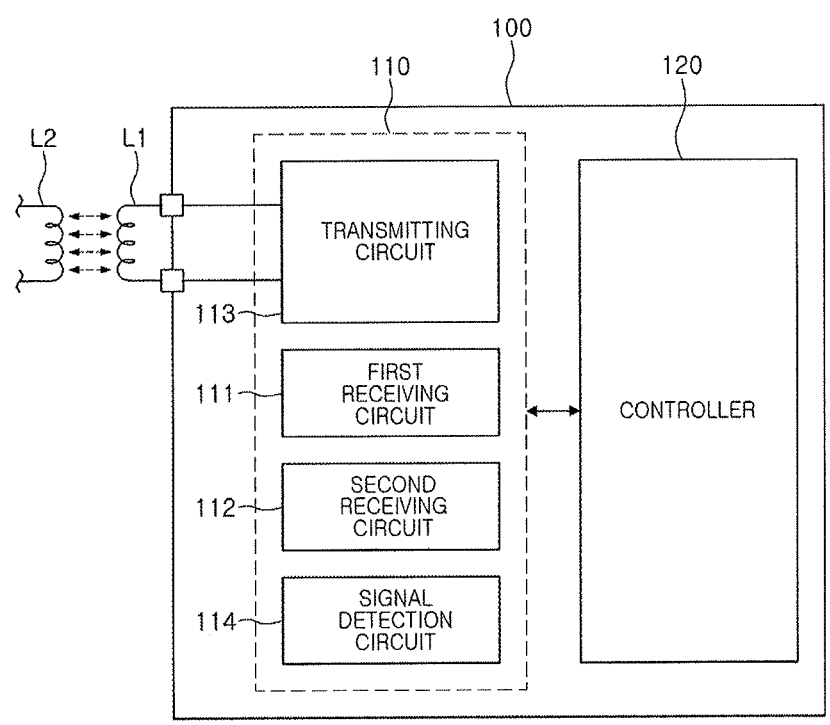
FIG. 3 illustrates an embodiment of an NFC device.

FIG. 3 illustrates an embodiment of an NFC device 100, which, for example, may correspond to NFC device 15. The NFC device 100 may include a communications module 110 and a controller 120. The communications module 110 may include a first receiving circuit (or first receiver) 111 and a second receiving circuit 112 (or second receiver) for receiving a wireless signal from an external reader, an NFC tag, or the like, a transmitting circuit (or transmitter) 113 for transmitting the wireless signal to the external reader or the NFC tag, and a signal detection circuit 114. The controller 120 may control operations of the communications module 110.

The communications module 110 may be connected to a first coil L1 and may communicate with the NFC tag or the external reader (including a second coil L2) through the first coil L1. In an example embodiment, when the communications module 11 applies an electrical signal to the first coil L1, an RF field may be generated in the first coil L1 and the electrical signal may be induced to the second coil L2 by the RF field. The NFC tag or the external reader including the second coil L2 may sense the electrical signal induced to the second coil L2, thereby communicating with the NFC device 100.

The first receiving circuit 111 and the second receiving circuit 112 may be activated and operate in different operating modes. In an example embodiment, the first receiving circuit 111 may be activated when the NFC device 100 operates in a card emulation mode for communicating with the external reader or another device. The second receiving circuit 112 may be deactivated in the card emulation mode. The second receiving circuit 112 may be activated when the NFC device 100 operates in a reader mode for communicating with the NFC tag. The first receiving circuit 111 may be deactivated in the reader mode.

The transmitting circuit 113 may transmit a wireless signal through the first coil L1 and, for example, may include a transmitter, a DC-to-DC converter, and/or other features. The transmitter and the DC-to-DC converter may operate in synchronization with a predetermined clock signal. In the example embodiment of FIG. 3, a wireless signal may be transmitted to a single transmitting circuit 113 in a card emulation mode and a reader mode. In a manner different therefrom, a plurality of transmitting circuits may be individually activated in a card emulation mode and a reader mode, respectively, and may also be included in the NFC device 100.

The signal detection circuit 114 may detect a wireless signal transmitted to the first coil L1 and may detect the presence or absence of the wireless signal and the magnitude of the wireless signal. In an example embodiment, for example, when the NFC device 100 operates in the card emulation mode, the signal detection circuit 114 may detect the presence or absence and a magnitude of the wireless signal transmitted to the first coil L1 and may transmit the detection result to the controller 120. The controller 120 may control the first receiving circuit 111 and the transmitting circuit 113 to enter a sleep more or to operate in a wakeup mode based on information transmitted by the signal detection circuit 114.

In the card emulation mode, since the NFC device 100 operates in the same manner as that of the NFC tag, the first receiving circuit 111 and the transmitting circuit 113 may be activated only when the wireless signal is transmitted to the first coil L1 by the external reader, in terms of power consumption management. Further, the sensitivity of the signal detection circuit 114 may be increased to improve performance of the NFC device 100 in the card emulation mode. By increasing the sensitivity of the signal detection circuit 114, the first receiving circuit 111 and the transmitting circuit 113 may operate while maintaining the wakeup mode, even for a wireless signal having a relatively low magnitude (e.g., below a predetermined value).

On the other hand, for example, when the NFC device 100 supports a financial transaction function (e.g., a credit card payment) in a card emulation mode, the NFC device 100 may have to pass a certain authentication procedure defined by the EMV standard or another standard. In the case of the EMV standard, a field off test may be performed as an authentication procedure. The field off test may involve forcibly reducing the magnitude of a wireless signal transmitted by an external reader for a predetermined period of time and determining an operation of the NFC device 100. Thus, when the sensitivity of the signal detection circuit 114 is increased to improve performance of the NFC device 100, a field off may not be properly recognized in the field off test.

In an example embodiment, the sensitivity of the signal detection circuit 114 may be changed depending on an operating mode of the NFC device 100. As a result, the occurrence of a trade-off problem as described above may be prevented. The sensitivity of the signal detection circuit 114 may be increased in a normal condition, and may increase or decrease in compliance with required test conditions when an authentication procedure (e.g., a field off test) is carried out. In an example embodiment, the sensitivity of the signal detection circuit 114 may be controlled by the controller 120. The controller 120 may determine a condition of the NFC device 100 (e.g., referring to the magnitude or other features of the wireless signal detected by the signal detection circuit 114) and may increase or decrease the sensitivity of the signal detection circuit 114.

Figure 4:
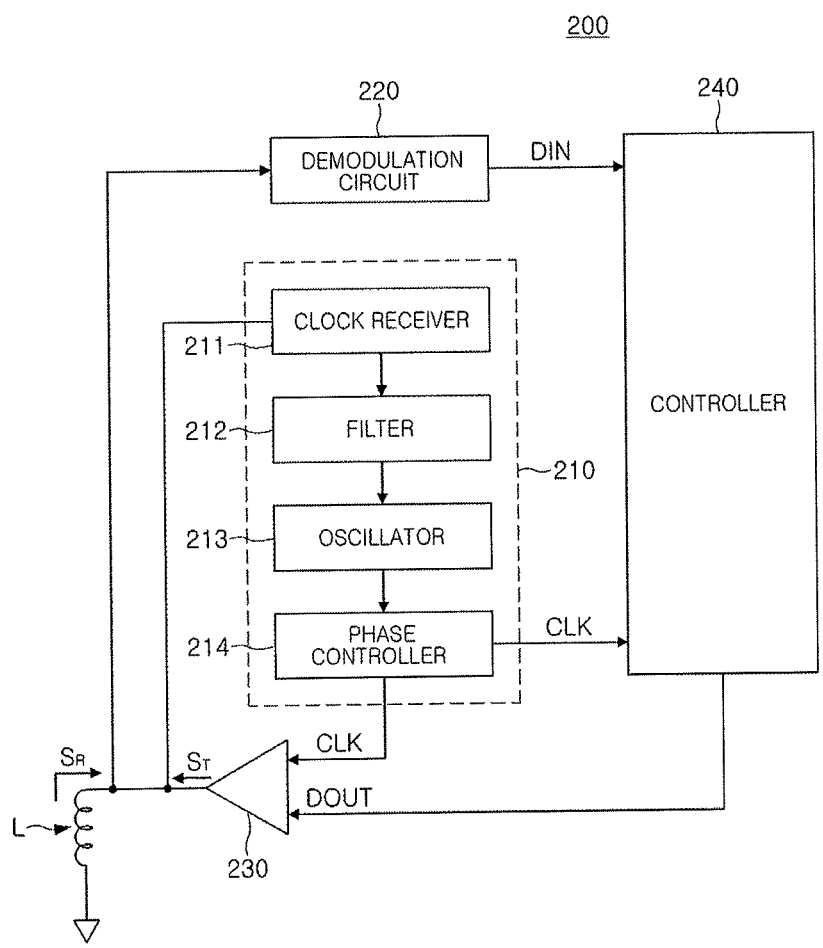
FIG. 4 illustrates an embodiment of a transmitting circuit and a receiving circuit.

FIG. 4 illustrates an embodiment of a transmitting circuit and a receiving circuit of the NFC device. In an example embodiment, FIG. 4 may illustrate an embodiment of operations of an NFC device 200 in a card emulation mode.

Referring to FIG. 4, the NFC device 200 may include a clock generation circuit (or clock generator) 210, a demodulation circuit 220, a transmitter 230, and a controller 240. The clock generation circuit 210 and the demodulation circuit 220 may be in a receiving circuit to receive a signal generated by an RF field transmitted to a coil L. The transmitter 230 may be in a transmitting circuit transmitting a signal to the coil L.

The clock generation circuit 210 may generate a clock signal CLK from a receiving signal $S_R$ generated by the coil L. In an example embodiment, the receiving signal $S_R$ may be generated in the coil L by an RF field transmitted to the coil L. The clock generation circuit 210 may include, for example, a clock receiver 211, a filter 212, an oscillator 213, and a phase controller 214. The clock receiver 211 may generate a reference clock from the receiving signal $S_R$. In an example embodiment, the reference clock may have a frequency of 13.56 MHz. This frequency may be different in another embodiment.

The reference clock may be provided to the transmitter 230 as a clock signal CLK, via the filter 212, the oscillator 213, and the phase controller 214. In an example embodiment, the clock signal CLK may also be supplied to the controller 240. The controller 240 may transmit output data DOUT to the transmitter 230 in synchronization with the clock signal CLK. The transmitter 230 may generate a transmission signal $S_T$ by interposing the output data DOUT on the clock signal CLK, and then may output the superimposed signal via the coil L.

The demodulation circuit 220 may demodulate the receiving signal $S_R$ to extract input data DIN and may transmit the input data DIN to the controller 240. The input data DIN may include information transmitted by an external reader. The controller 240 may generate output data DOUT based on the input data DIN and may transmit the generated output data to the transmitter 230.

As described above, the example embodiment of FIG. 4 may correspond to the case in which the NFC device 200 operates in a card emulation mode. Thus, continuous operation of the NFC device 200, even when the receiving signal $S_R$ transmitted by the external reader is not present, may lead to excessive power consumption. Thus, for example, when the NFC device 200 according to an example embodiment operates in a card emulation mode, the clock generation circuit 210, the demodulation circuit 220, the transmitter 230, and the controller 240 may enter a sleep mode in which a relatively low amount of power is consumed, when the receiving signal $S_R$ is not present.

The clock generation circuit 210, the demodulation circuit 220, the transmitter 230, and the controller 240 may be released from the sleep mode based on the presence or absence and the magnitude of the receiving signal $S_R$ detected by the signal detection circuit, and may be switched to a wakeup mode. In an example embodiment, the signal detection circuit may determine the presence or absence of the receiving signal $S_R$ every predetermined period, and may request that the controller 240 control the clock generation circuit 210, the demodulation circuit 220, and the transmitter 230 to be switched to the wakeup mode when the receiving signal $S_R$ is determined to be present. The controller 240 may release the sleep mode of the clock generation circuit 210, the demodulation circuit 220, and the transmitter 230 based on the request of the signal detection circuit and may perform switching to the wakeup mode.

Figure 5:
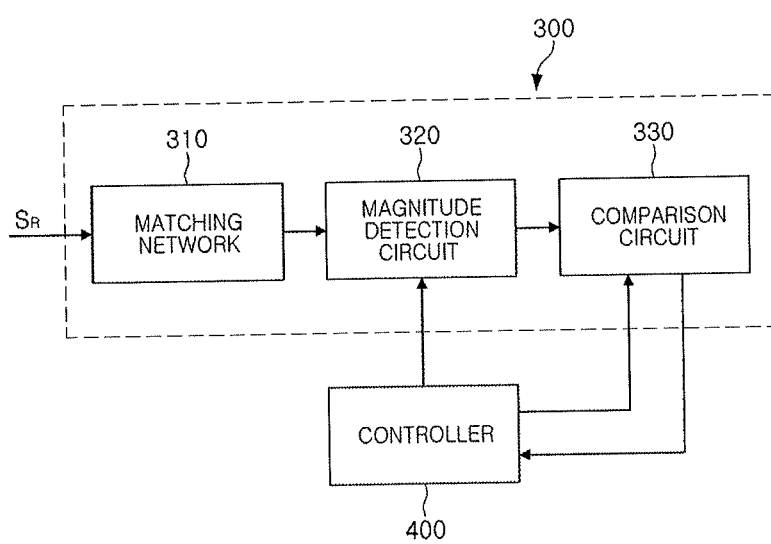
FIG. 5 illustrates an embodiment of a signal detection circuit.

FIG. 5 illustrates an embodiment of a signal detection circuit 300, which, for example, may be included in the NFC device.

Referring to FIG. 5, the signal detection circuit 300 may include a matching network 310, a magnitude detection circuit 320, and a comparison circuit (or comparator) 330. The matching network 310 may include a circuit for the matching impedance of a receiving signal $S_R$. The magnitude detection circuit 320 may detect the magnitude of the receiving signal $S_R$. The comparison circuit 330 may compare the magnitude of the receiving signal $S_R$ with a predetermined reference signal and may transmit the comparison result to a controller 400.

The controller 400 may be a processor to control an NFC device including the signal detection circuit 300. The controller 400 may switch the NFC device from wakeup mode to sleep mode, or from sleep mode to wakeup mode, based on the output of the comparison circuit 330.

In an example embodiment, the controller 400 may adjust the sensitivity of the signal detection circuit 300. For example, when the sensitivity of the signal detection circuit 300 is increased, the controller 400 may control the NFC device to operate in the wakeup mode, even when the receiving signal $S_R$ has a relatively low magnitude. When the sensitivity of the signal detection circuit 300 is reduced, the NFC device may be switched from the wakeup mode to a sleep mode, relatively easily. In an example embodiment, an application for adjusting the sensitivity of the signal detection circuit 300 may be provided to a user using the NFC device.

In an example embodiment, the controller 400 may tune the sensitivity of the signal detection circuit 300 by referring to an operating condition of the NFC device. As an example, when the NFC device is in a normal operating environment, the controller 400 may increase the sensitivity of the signal detection circuit 300 to increase a communicational range of the NFC device.

Various financial transaction services using an NFC device have been developed. May business operations want authentication procedures to be performed for financial transaction services. The nature of these authentication procedures are diverse and may vary from business operator to business operator. As an example, the authentication procedure including a field off test is to be performed in the EMV standard for card payment services using an NFC device. In order to pass the field off test, a receiving signal $S_R$ having a predetermined magnitude defined by the EMV standard should not be sensed by the NFC device. Thus, the sensitivity of the signal detection circuit 300 may be reduced when the authentication procedure such as the field off test is carried out.

According to an example embodiment, the controller 400 may adjust the sensitivity of the signal detection circuit 300 based on an operating condition of the NFC device. As an example, the controller 400 may change the sensitivity of the signal detection circuit 300 by changing the gain of the magnitude detection circuit 320 or the gain of the comparison circuit 330, and/or by increasing or reducing the magnitude of a reference signal compared with the magnitude of the receiving signal $S_R$ by the comparison circuit 330.

Figure 6:
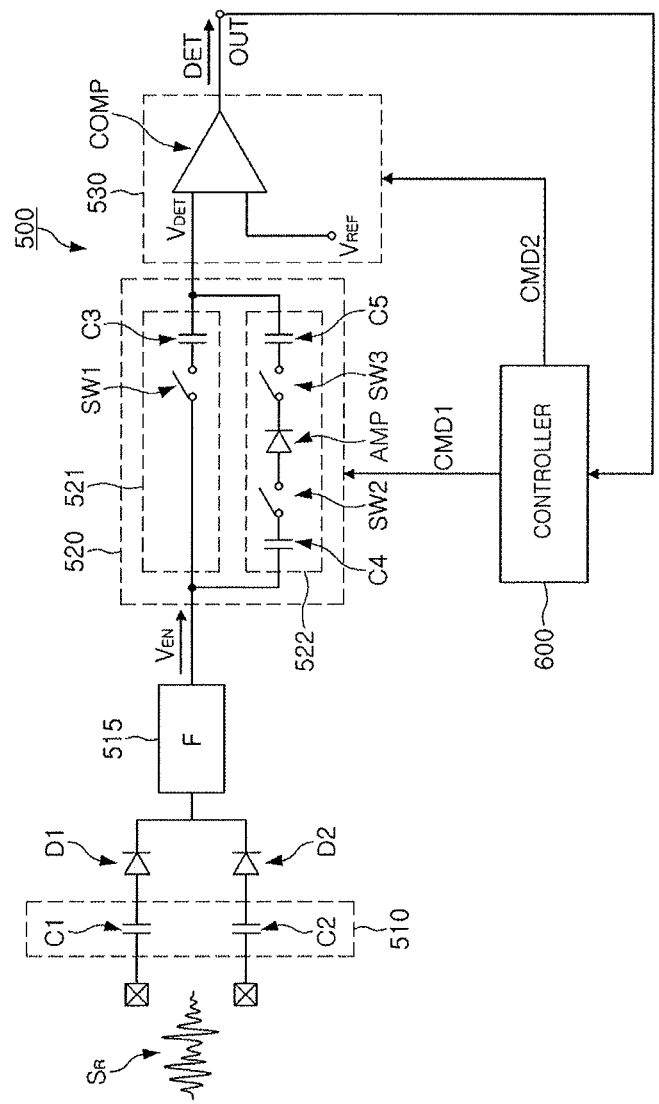
FIGS. 6 to 8 illustrate embodiments of operations of the signal detection circuit.
Figure 7:
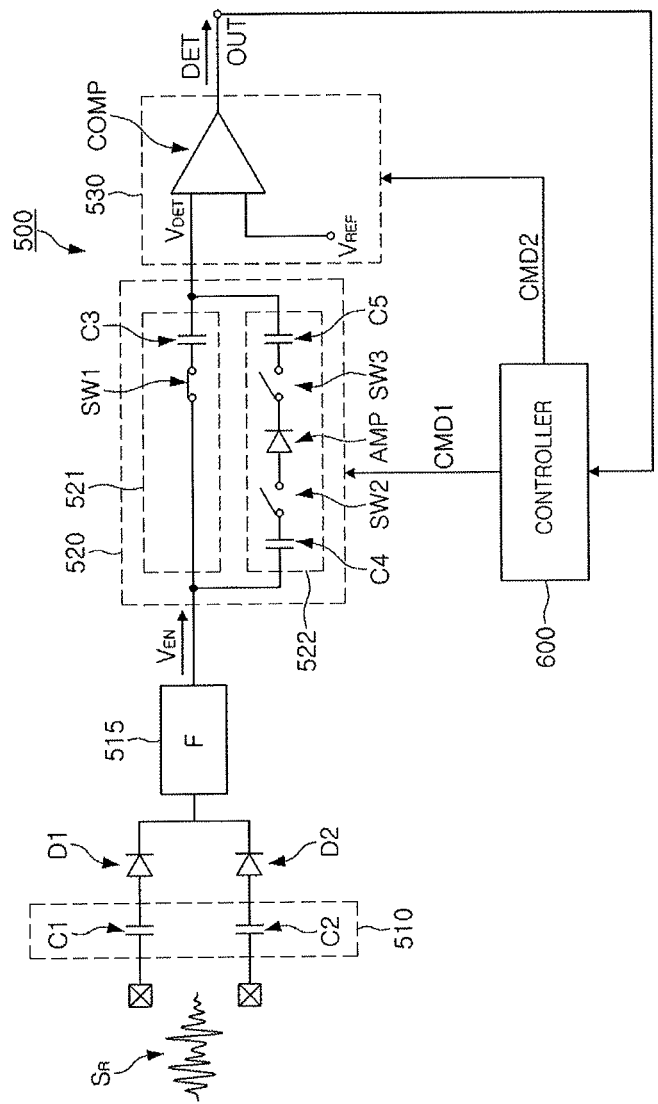
Figure 8:
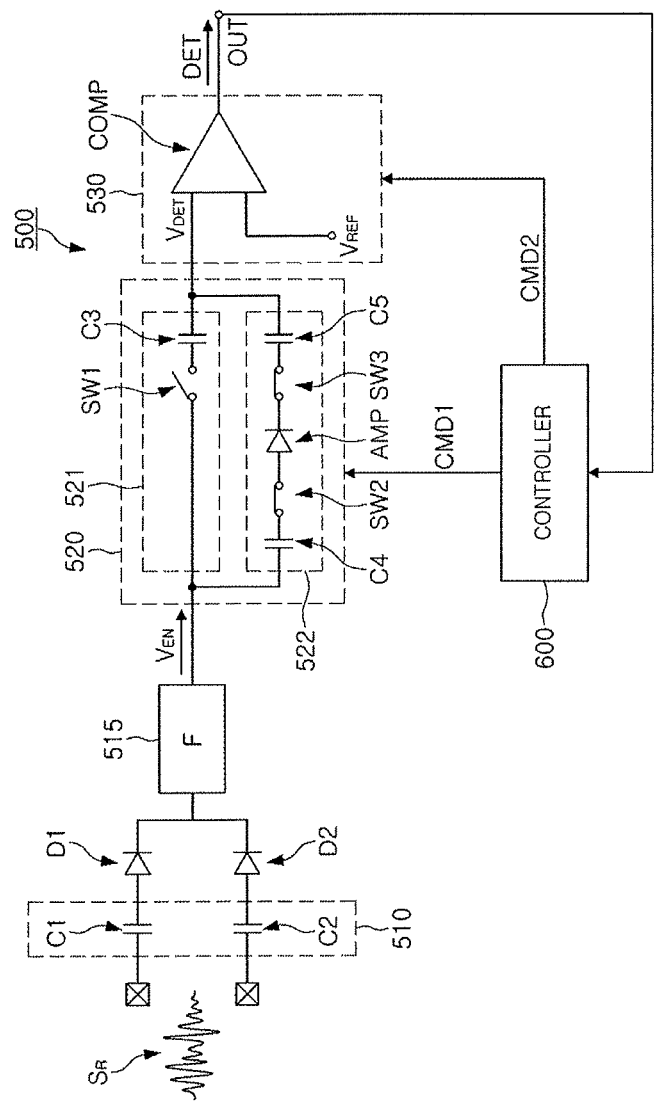

FIGS. 6 to 8 illustrate embodiments of operations of the signal detection circuit 500 in an NFC device. With reference to FIG. 6, the signal detection circuit 500 may include a matching network 510, a filter 515, a magnitude detection circuit 520, and a comparison circuit 530. The matching network 510 includes first and second capacitors C1 and C2, but may be implemented by different types of circuits in another embodiment.

The filter 515 may include a resistor, a capacitor, and/or other features. First and second diodes D1 and D2 may be connected between the matching network 510 and the filter 515. Thus, the first and second diodes D1 and D2, and the filter 515, may operate as envelope detectors. In an example embodiment, an envelope voltage $V_{EN}$ output by the filter 515 may have a magnitude proportional to a magnitude of the receiving signal $S_R$.

The magnitude detection circuit 520 may generate a detection voltage $V_{DET}$ using the envelope voltage $V_{EN}$. The magnitude detection circuit 520 may include a first magnitude detection circuit 521 connected to a second magnitude detection circuit 522 in parallel. One of the first magnitude detection circuit 521 and the second magnitude detection circuit 522 may be activated based on a first control command CMD1 transmitted by a controller 600. In one embodiment, the first magnitude detection circuit 521 may be a passive circuit not including an active device and may include a first switch SW1 and a third capacitor C3.

The second magnitude detection circuit 522 may be an amplification circuit including an amplifier AMP, as at least one active device. The second magnitude detection circuit 522 may include second and third switches SW2 and SW3, fourth and fifth capacitors C4 and C5, and an amplifier AMP. The third to fifth capacitors C3 to C5 in the first and second magnitude detection circuits 521 and 522 may remove a direct current (DC) component from the envelope voltage $V_{EN}$.

The comparison circuit 530 may include a comparator COMP to compare the detection voltage $V_{DET}$ (generated based on the magnitude detection circuit 520) and a reference voltage $V_{REF}$ and generate a detection signal DET. In an example embodiment, the comparison circuit 530 may output the detection signal DET to the controller 600. The controller 600 may switch the NFC device from a wakeup mode to a sleep mode, or from a sleep mode to a wakeup mode, based on the detection signal DET.

The sensitivity of the signal detection circuit 500 may be determined based on whether the respective first magnitude detection circuit 521 and/or second magnitude detection circuit 522 are activated or not, gains of the amplifier AMP and the comparator COMP, and/or the magnitude of the reference voltage $V_{REF}$. In an example embodiment, the controller 600 may activate the first magnitude detection circuit 521, activate the second magnitude detection circuit 522, lower the gain of the amplifier AMP, increase the reference voltage $V_{REF}$, and/or reduce the gain of the comparator COMP as a way of reducing the sensitivity of the signal detection circuit 500.

The controller 600 may activate the second magnitude detection circuit 522, increase a gain of the amplifier AMP, decrease the reference voltage $V_{REF}$, and/or increase the gain of the comparator COMP in order to increase the sensitivity of the signal detection circuit 500. In an example embodiment, the controller 600 may tune the sensitivity of the signal detection circuit 500. As a result, the NFC device may exhibit appropriate performance suitable for various operating conditions.

In a normal condition (in which the NFC device communicates with an external reader in a card emulation mode), performance of the NFC device may be increased as the sensitivity of the signal detection circuit 500 increases. In a test condition to determine whether conditions in the EMV standard or another standard have been satisfied, the sensitivity of the signal detection circuit 500 may be lowered to pass the field off test. Examples of operations of the signal detection circuit 500 and the controller 600 based on operating conditions are described with reference to FIGS. 7 and 8.

FIG. 7 illustrates an embodiment of an operating condition where the sensitivity of the signal detection circuit 500 is lowered. The controller 600 may turn a first switch SW1 on and may turn second and third switches SW2 and SW3 off in order to activate the first magnitude detection circuit 521 and deactivate the second magnitude detection circuit 522. Thus, since the envelope voltage $V_{EN}$ is not amplified in the magnitude detection circuit 520, the sensitivity of the signal detection circuit 500 may be lowered. Further, in the example embodiment of FIG. 7, the controller 600 may lower the gain and/or offset of the comparator COMP and/or may increase the reference voltage $V_{REF}$ to lower the sensitivity of the signal detection circuit 500.

FIG. 8 illustrates an embodiment of an operating condition where the sensitivity of the signal detection circuit 500 is increased. The controller 600 may turn a first switch SW1 off and may turn second and third switches SW2 and SW3 on in order to deactivate the first magnitude detection circuit 521 and activate the second magnitude detection circuit 522. Thus, the envelope voltage $V_{EN}$ may be amplified by the amplifier AMP of the second magnitude detection circuit 522, in order to increase the sensitivity of the signal detection circuit 500. Further, in the example embodiment of FIG. 8, the controller 600 may increase the gain and/or offset of the comparator COMP and/or may decrease the reference voltage $V_{REF}$.

The circuit diagram of FIG. 7 illustrates an example of a tuning state with respect to the sensitivity of the signal detection circuit 500 to pass the field off test defined by the EMV standard. The circuit diagram of FIG. 8 illustrates an example of a tuning state of the sensitivity of the signal detection circuit 500 at the time of operating in a card emulation mode by an external reader. For example, at the time of receiving a wireless signal from the external reader and operating in the card emulation mode, the sensitivity of the signal detection circuit 500 may be increased (as illustrated, for example, in the circuit diagram of FIG. 8) such that the communication distance from the external reader may be increased. When the field off test is performed, the sensitivity of the signal detection circuit 500 may be lowered (as illustrated, for example, in the circuit diagram of FIG. 7) such that the NFC device may not sense the receiving signal $S_R$ in the field off condition, thereby passing the field off test. Examples will be described with reference to FIGS. 9 and 10.

Figure 9:
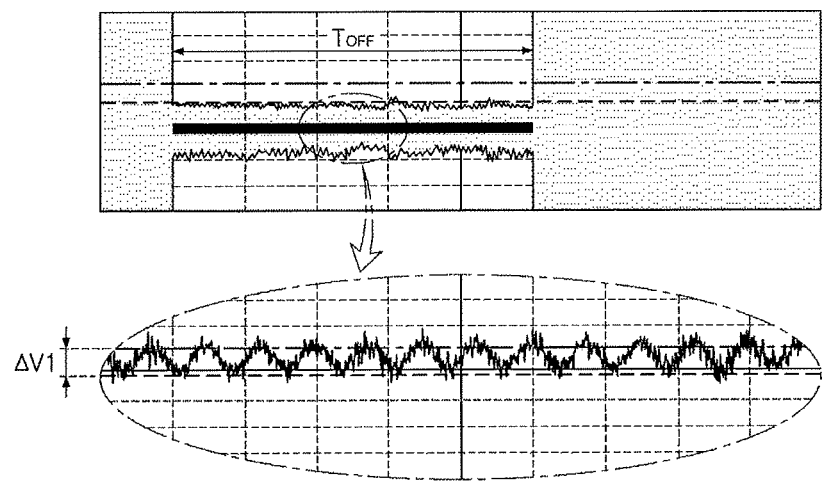
FIGS. 9 and 10 illustrate additional embodiments of an NFC device.
Figure 10:
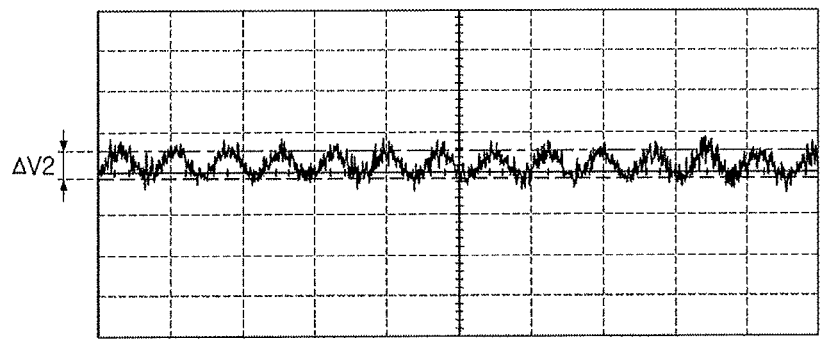

FIGS. 9 and 10 illustrate embodiments of operations of an NFC device. The graph of FIG. 9 illustrates an example of the magnitude of a receiving signal in a test condition in which a field off test or the like is performed. The graph of FIG. 10 illustrates an example of the magnitude of a receiving signal in a normal condition of communicating with an external reader in a card emulation mode.

Referring to FIG. 9, an off section $T_{OFF}$ may be present in a test condition. In the an off section $T_{OFF}$, the magnitude of the receiving signal $S_R$ is significantly decreased. When the field off test is defined by the EMV standard, the receiving signal $S_R$ may have a non-zero magnitude in the off section $T_{OFF}$. With reference to FIG. 9, the magnitude of the receiving signal $S_R$ may be $\Delta V1$ in the off section $T_{OFF}$. When the NFC device does not sense the receiving signal $S_R$ during the off section $T_{OFF}$, the NFC device may pass the field off test. In an example embodiment, $\Delta V1$ may be a magnitude of about 15 mV.

With reference to FIG. 10, the sensitivity of the signal detection circuit 500 may be tuned to sense the receiving signal $S_R$ having a relatively low magnitude (e.g., below a predetermined value) in order to increase the distance of communication with the external reader in the normal condition. In an example embodiment, the graph of FIG. 10 illustrates an example of a receiving signal $S_R$ detected by the signal detection circuit 500 when the distance between the NFC device and the external reader is about 10 cm. The magnitude $\Delta V2$ of the receiving signal $S_R$ in the example embodiment of FIG. 10 may be about 13 mV. The values of $\Delta V1$ and/or $\Delta V2$ may be different in other embodiments.

In the example embodiments of FIGS. 9 and 10, the magnitude $\Delta V1$ of the receiving signal $S_R$ in the off section $T_{OFF}$ of the test condition may be greater than the magnitude $\Delta V2$ of the receiving signal $S_R$ transmitted by the external reader in the normal condition. Thus, when the sensitivity of the signal detection circuit 500 is set to secure sufficient performance of the NFC device in the normal condition, the NFC device may operate based on the receiving signal $S_R$ in the off section $T_{OFF}$. As a result, the field off test of the EMV standard may not be passed, which may be problematic.

According to an example embodiment, as the sensitivity of the signal detection circuit 500 is changed depending on an operating condition of the NFC device, the occurrence of a problem as described above (in which the NFC device may not pass the field off test of the EMV standard) may be prevented. For example, in the test condition of FIG. 9, the sensitivity of the signal detection circuit 500 may be lowered, such that the NFC device may not operate based on the receiving signal $S_R$ having a magnitude of $\Delta V1$ in the off section $T_{OFF}$. In an example embodiment, in the test condition, the signal detection circuit 500 may be set as illustrated in FIG. 7. In the normal condition of FIG. 10, the sensitivity of the signal detection circuit 500 may be increased, such that the NFC device may operate based on the receiving signal $S_R$ having a magnitude of $\Delta V2$. In an example embodiment, in the normal condition, the signal detection circuit 500 may be set as illustrated in FIG. 8. The sensitivity of the signal detection circuit 500 may be adjusted by the controller 600.

Figure 11:
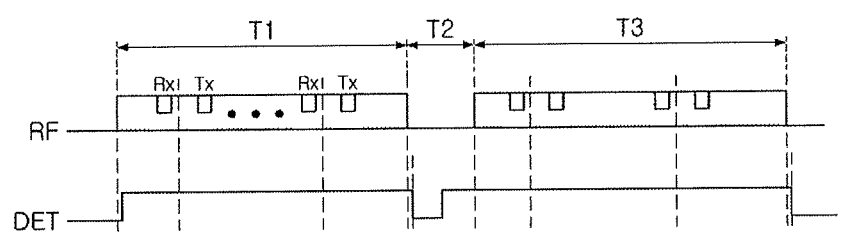
FIG. 11 illustrates an additional embodiment of an NFC device.

FIG. 11 illustrates an embodiment of operations of an NFC device. Referring to FIG. 11, an RF field RF may be formed in the vicinity of the NFC device, and a receiving signal may be generated, in a coil connected to the NFC device via the RF field RF. As the magnitude of the RF field RF is increased, the receiving signal having a relatively high magnitude may be generated in the coil connected to the NFC device.

A signal detection circuit may compare the magnitude of the receiving signal, generated in the coil, with the magnitude of a reference signal in order to generate a detection signal DET. In an example embodiment, the detection signal DET may have a high logic value when the magnitude of the receiving signal is greater than that of the reference signal, and may have a low logic value when the magnitude of the receiving signal is less than that of the reference signal.

For example, when the NFC device operates in the test condition, the controller may reduce the sensitivity of the signal detection circuit, such that the NFC device may pass the field off test. With reference to FIG. 11, while the field off test is performed, the receiving signal may be divided into a first time T1, a second Time T2, and a third time T3. The receiving signal may have a first magnitude during the first time T1 and the third time T3 and may have a second magnitude less than the first magnitude during the second time T2. In one embodiment, the second magnitude may have a value greater than 0.

In the test condition, the controller may set the sensitivity of the signal detection circuit, such that the detection signal DET has a high logic value during the first time T1 and the third time T3 and a low logic value during the second time T2. Referring to the circuit diagram of FIG. 7, the controller 600 may generate a detection voltage $V_{DET}$ by activating the first magnitude detection circuit 521 and may lower the sensitivity of the signal detection circuit 500 by reducing the gain and/or an offset of the comparator COMP and/or increasing the reference voltage $V_{REF}$. As an example, the reference voltage $V_{REF}$ may be set to a value greater than that of the detection voltage $V_{DET}$ generated from the receiving signal $S_R$ during the second time T2 and lower than that of the detection voltage $V_{DET}$ generated from the receiving signal $S_R$ during the first time T1 and the third time T3.

Figure 12:
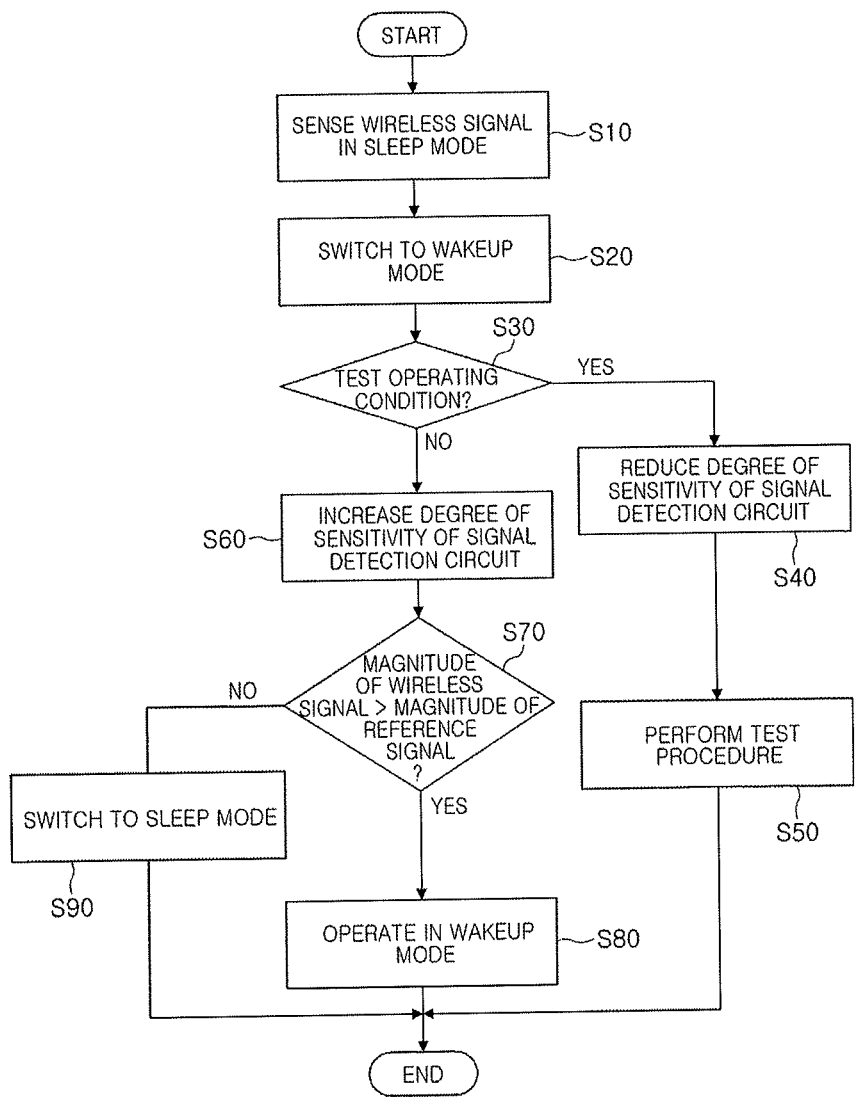
FIGS. 12 and 13 embodiments of operations of an NFC device.
Figure 13:
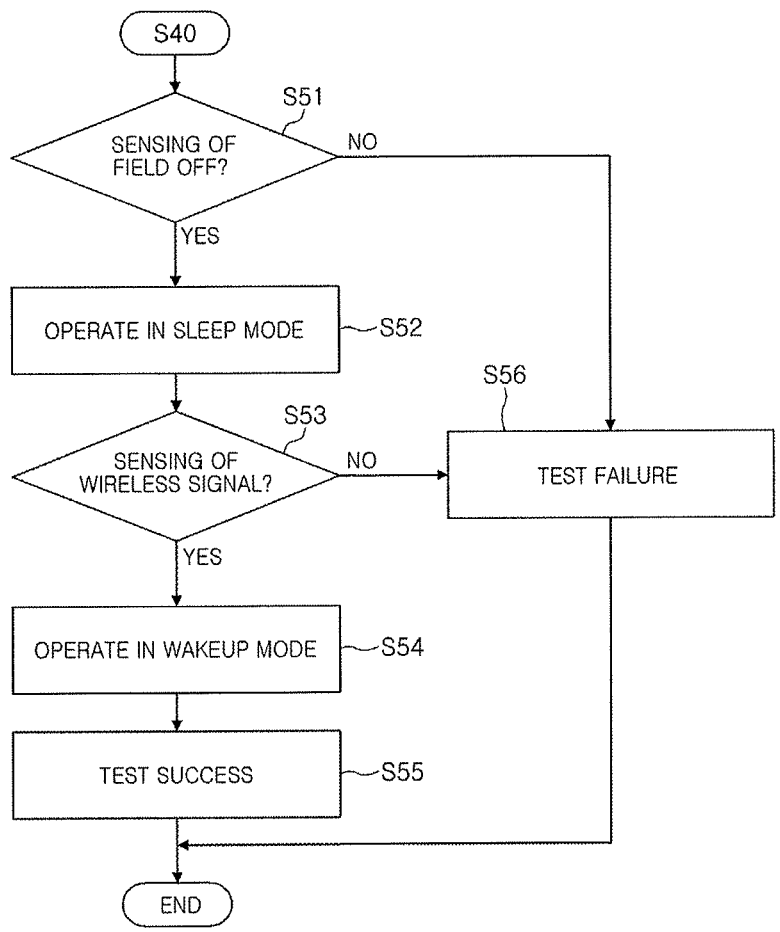

FIGS. 12 and 13 illustrate additional embodiments of operations of an NFC device. Referring to FIG. 12, operation of the NFC device may begin with sensing a wireless signal by a signal detection circuit when the NFC device operates in a sleep mode, in S10. The NFC device may include at least one coil, and an electrical signal may be induced to the coil by an RF field formed in the vicinity of the NFC device. The signal detection circuit may sense the electrical signal, induced to the coil, as the wireless signal.

A controller of the NFC device may switch the NFC device to a wakeup mode based on the wireless signal sensed in S10, in S20. When the NFC device is switched to the wakeup mode, the controller of the NFC device may determine whether or not a current operating condition is a test condition, in S30. In an example embodiment, the test condition may include a test corresponding to an authentication system for financial transactions. For example, the test may include a field off test as defined by an EMV standard. Since an RF field having a relatively great magnitude (e.g., above a predetermined value) is formed in the test condition, as compared with that in a normal condition of communicating with an external reader, the controller may determine whether the operating condition of the NFC device is a test condition based on the magnitude of the wireless signal.

Based on the determination result in S30, when the operating condition of the NFC device is determined to be the test condition, the controller may lower a sensitivity of the signal detection circuit in S40. In an example embodiment, the controller may activate a first magnitude detection circuit and may deactivate a second magnitude detection circuit in the signal detection circuit. The first magnitude detection circuit may be incapable of amplifying an envelope voltage generated from the wireless signal. The second magnitude detection circuit may be capable of amplifying the envelope voltage. For example, the sensitivity of the signal detection circuit may be lowered, based on a comparison of the envelope voltage without amplification thereof and a reference voltage to determine presence or absence of the wireless signal. In one embodiment, the sensitivity of the signal detection circuit may be lowered by decreasing the gain and/or an offset of the comparator, comparing the envelope voltage with the reference voltage, or increasing the reference voltage.

When the operation for reducing the sensitivity of the detection circuit is completed, the controller may perform a test procedure in S50. An example of the test procedure is described with reference to FIG. 13.

Based on the determination result in S30, when the current operating condition is determined not to be the test condition, the controller may increase the sensitivity of the signal detection circuit in S60. In an example embodiment, the controller may deactivate the first magnitude detection circuit and may activate the second magnitude detection circuit. For example, the signal detection circuit may amplify the envelope voltage to be compared with the reference voltage, thereby determining the presence or absence of the wireless signal and, thus, increasing the sensitivity of the signal detection circuit to also sense the wireless signal having a low magnitude.

In addition, the controller may lower the sensitivity of the signal detection circuit by increasing the gain of the second magnitude detection circuit and/or increasing the gain and/or an offset of the comparator, comparing the envelope voltage and the reference voltage, and reducing the reference voltage.

When the operation of increasing the sensitivity of the signal detection circuit is completed, the controller may determine whether the magnitude of the wireless signal is greater than a magnitude of the reference signal based on a detection signal output by the signal detection circuit, in S70. Based on the determination result in S70, when the magnitude of the wireless signal is greater than the magnitude of the reference signal, the controller may maintain the wakeup mode of the NFC device as is, in S80. When the magnitude of the wireless signal is less than the magnitude of the reference signal in the determination result in S70, the controller may reswitch the NFC device to the sleep mode, in S90.

FIG. 13 illustrates an example of a series of processes performed in a test condition. Referring to FIG. 13, an NFC device may operate in a wakeup mode during a test procedure. The NFC device may communicate with an external reader, or the like. In the wakeup mode using the wireless signal sensed in S10. On the other hand, the controller may periodically detect whether a field off (in which communications with the external reader or the like are not performed) due to a reduction in the magnitude of the wireless signal occurs or not via a signal detection circuit, in S51.

When the field off is detected in the determination result of S51, the controller may control the NFC device to operate in a sleep mode, in S52 and may redetermine whether the wireless signal is detected by an increase in a magnitude of an RF field in S53. When the RF field is detected in the determination result of S53, the controller may control the NFC device to reoperate in the wakeup mode in S54 and may determine a test success in S55.

On the other hand, when the RF field off is not detected in the determination result of S51 or the RF field is not detected in S53, the controller may determine test failure determination in S56. For example, in the field off test defined by the EMV standard (e.g., an authentication standard for NFC devices), an RF field may be generated for a first time, may be weakened for a second time, and may be regenerated for a third time. In the conditions as described above, for example, when the NFC device does not operate in the wakeup mode for the first time and the third time, or does not operate in the sleep mode for the second time, the NFC device may be determined not to pass the field off test.

Figure 14:
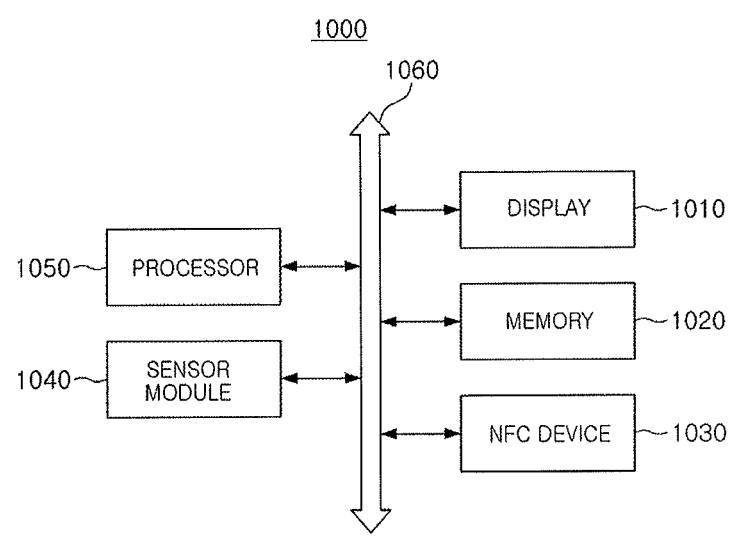
FIG. 14 illustrates another embodiment of a device including an NFC device.

FIG. 14 illustrates another embodiment of an electronic device 1000 including an NFC device. Referring to FIG. 14, the electronic device 1000 may include a display 1010, a memory 1020, an NFC device 1030, a sensor module 1040, and a processor 1050. Examples of the electronic device 1000 include a television set, a desktop computer, and the like, as well as a mobile device such as a smartphone, a tablet PC, a laptop computer and the like. Components, such as the display 1010, the memory 1020, the NFC device 1030, the sensor module 1040, the processor 1050, and the like, may communicate with each other via a bus 1060.

The NFC device 1030 may correspond to any of the embodiments described herein. Conditions of a field off test may be satisfied, and the sensitivity of a signal detection circuit in the NFC device 1030 may also be adjusted, to secure a distance sufficient to communicate with an external reader in a normal card emulation mode.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods described herein.

The controllers, processors, comparators, filters, detectors, demodulators, transmitters, receivers, matching networks, amplifiers, and other signal providing, signal generating, and signal processing features of the embodiments disclosed herein may be implemented in non-transitory logic which, for example, may include hardware, software, or both. When implemented at least partially in hardware, the controllers, processors, comparators, filters, detectors, demodulators, transmitters, receivers, matching networks, amplifiers, and other signal providing, signal generating, and signal processing features may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, the controllers, processors, comparators, filters, detectors, demodulators, transmitters, receivers, matching networks, amplifiers, and other signal providing, signal generating, and signal processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

The various operations of methods described above may be performed by any suitable means capable of performing the operations, such as various hardware and/or software component(s), circuits, and/or module(s).

The software may comprise an ordered listing of executable instructions for implementing logical functions, and can be embodied in any "processor-readable medium" for use by or in connection with an instruction execution system, apparatus, or device, such as a single or multiple-core processor or processor-containing system.

The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

In accordance with one or more of the aforementioned example embodiments, an NFC device may include a signal detection circuit to sense a wireless signal and determine a sleep mode or a wakeup mode. The sensitivity of the signal detection circuit may be changed depending on operating conditions of the NFC device. Thus, the NFC device may be tuned to have performance complying with operating conditions of the NFC device.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, various changes in form and details may be made without departing from the spirit and scope of the embodiments set forth in the claims.

What is claimed is:

1. A near field communication (NFC) device, comprising:
   a communications module including a receiver to receive a wireless signal, a transmitter to transmit data by superimposing the data on the wireless signal, and a signal detector to compare the wireless signal with a predetermined reference signal, the communications module to operate in at least one of a wakeup mode and a sleep mode, the receiver and the transmitter to be activated to operate in wakeup mode, and the receiver and the transmitter to be deactivated in sleep mode; and
   a controller to adjust a sensitivity of the signal detector based on a magnitude of the wireless signal and an operating condition of the communications module when the communications module enters the wakeup mode from the sleep mode,
   wherein the signal detector includes a comparator to compare the magnitude of the wireless signal with a magnitude of the predetermined reference signal, and a magnitude detector to detect the magnitude of the wireless signal input to the comparator, and the controller is to determine whether to maintain the wakeup mode of the communications module based on an output of the comparator.

2. The NFC device as claimed in claim 1, wherein the controller is to adjust the sensitivity of the signal detector by changing at least one of a gain of the magnitude detector, a gain of the comparator, and the magnitude of the predetermined reference signal.

3. The NFC device as claimed in claim 1, wherein the operating condition of the communications module includes:
a test condition to determine whether the communications module satisfies a condition for an authentication procedure for financial transactions and a normal condition in which the communications module is to communicate with an external reader.

4. The NFC device as claimed in claim 3, wherein:
when the operating condition of the communications module is the test condition, the controller is to reduce at least one of a gain of the magnitude detector and a gain of the comparator or increase the magnitude of the predetermined reference signal.

5. The NFC device as claimed in claim 3, wherein:
when the operating condition of the communications module is the normal condition, the controller is to increase at least one of a gain of the magnitude detector and a gain of the comparator or reduce the magnitude of the predetermined reference signal.

6. The NFC device as claimed in claim 3, wherein the magnitude detector includes:
a first magnitude detector to input the wireless signal to the comparator as is, and
a second magnitude detector including an active circuit to adjust the magnitude of the wireless signal to be input to the comparator.

7. The NFC device as claimed in claim 6, wherein:
when the operating condition of the communications module is the test condition, the controller is to input the wireless signal to the comparator through the first magnitude detector, and
when the operating condition of the communications module is the normal condition, the controller is to input the wireless signal to the comparator through the second magnitude detector.

8. The NFC device as claimed in claim 3, wherein the authentication procedure is a Europay Mastercard Visa (EMV) authentication procedure.

9. The NFC device as claimed in claim 1, wherein the signal detector includes a matching network and a filter connected to an input terminal of the magnitude detector.

10. The NFC device as claimed in claim 1, wherein the communications module is to operates in a card emulation mode in the wakeup mode.

11. The NFC device as claimed in claim 1, wherein the receiver includes:
a clock generator to generate a clock signal from the wireless signal, and
a demodulator to restore the data in the wireless signal.

12. The NFC device as claimed in claim 1, wherein the transmitter includes an output to superimpose data on a clock signal generated from the wireless signal and to output the superimposed data.

13. A near field communication (NFC) device, comprising:
a matching network to receive a wireless signal transmitted by an external reader;
a comparator to compare a magnitude of the wireless signal with a magnitude of a reference signal;
a first magnitude detector connected between the matching network and the comparator, the first magnitude detector to input the wireless signal received by the matching network to the comparator as is;
a second magnitude detector connected to the first magnitude detector in parallel between the matching network and the comparator, the second magnitude detector to adjust the magnitude of the wireless signal to be input to the comparator; and
a controller to activate at least one of the first magnitude detector and the second magnitude detector based on an operating condition of a communications module communicating with the external reader via the wireless signal and the magnitude of the wireless signal.

14. The NFC device as claimed in claim 13, wherein the operating condition of the communications module includes:
a test condition to determine whether the communications module satisfies a condition for an authentication system for financial transactions and a normal condition in which the communications module communicates with the external reader using the wireless signal.

15. The NFC device as claimed in claim 14, wherein the controller is to activate the first magnitude detector in the test condition and to activate the second magnitude detector in the normal condition.

16. The NFC device as claimed in claim 14, wherein:
in the test condition, the controller is to increase the magnitude of the reference signal input to the comparator.

17. The NFC device as claimed in claim 14, wherein:
in the test condition, the wireless signal transmitted by the external reader has a first magnitude for a first time and a third time and a second magnitude less than the first magnitude and greater than 0 for a second time between the first time and the third time.

18. The NFC device as claimed in claim 17, wherein:
the first magnitude is greater than the magnitude of the reference signal, and
the second magnitude is less than the magnitude of the reference signal.

19. A near field communication (NFC) device, comprising:
a first receiver to operate in a card emulation mode of the NFC device;
a second receiver to operate in a reader mode of the NFC device;
a transmitter to operate in the card emulation mode and the reader mode;
a signal detector to control power supplied to the first receiver and the transmitter based on detection of a wireless signal transmitted by an external reader in the card emulation mode; and
a controller to control power supplied to the first receiver and the transmitter based on an output from the signal detector in the card emulation mode, wherein the controller is to:
lower a sensitivity of the signal detector in a test condition to determine whether the first receiver and the transmitter satisfy a condition for an authentication system for financial transactions, and
increase the sensitivity of the signal detector in a normal condition in which the first receiver and the transmitter communicate with the external reader.

* * * * *